Feb. 13, 1923.
E. R. ULLOM.
SCOOP BOARD.
FILED AUG. 4, 1922.
1,445,571.
2 SHEETS—SHEET 1.
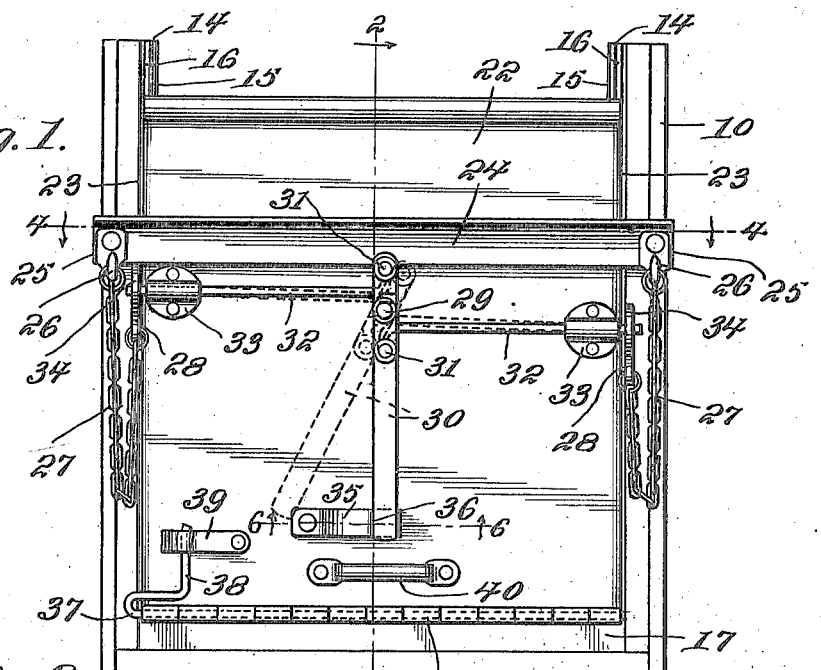
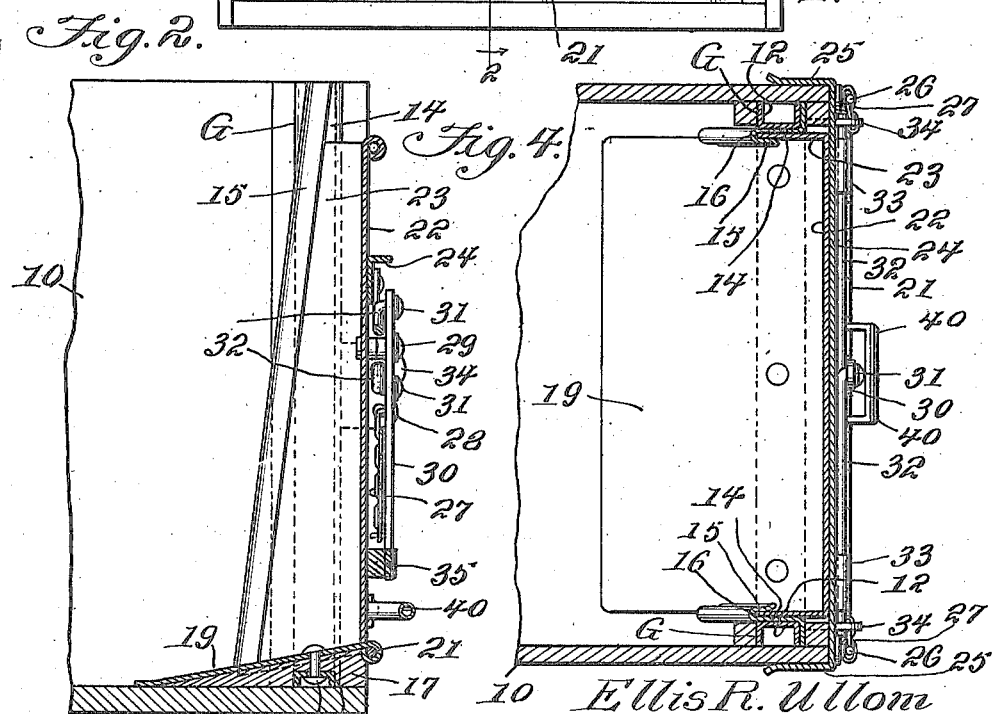
Ellis R. Ullom
INVENTOR
BY Victor J. Evans
ATTORNEY
WITNESS: J. T. L. Wright Feb. 13, 1923.
E. R. ULLOM.
SCOOP BOARD.
FILED AUG. 4, 1922.
1,445,571.
2 SHEETS—SHEET 2.
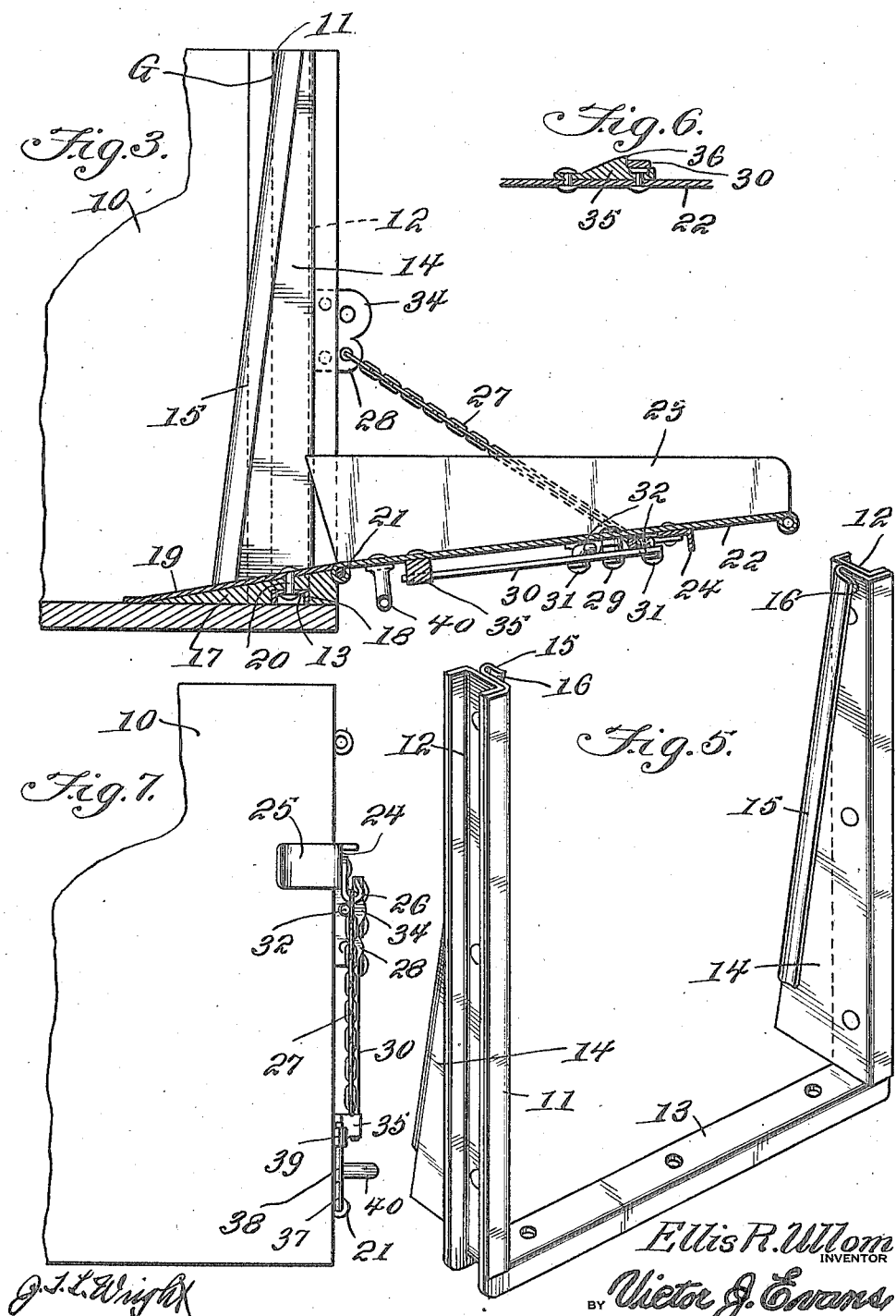

Patented Feb. 13, 1923.

1,445,571

UNITED STATES PATENT OFFICE.

ELLIS R. ULLOM, OF MILBURN, NEBRASKA.

SCOOP BOARD.

Application filed August 4, 1922. Serial No. 579,763.

*To all whom it may concern:*

Be it known that I, ELLIS R. ULLOM, a citizen of the United States, residing at Milburn, in the county of Custer and State of Nebraska, have invented new and useful Improvements in Scoop Boards, of which the following is a specification.

This invention relates to improvements in wagon bodies and the like and has for an object the provision of a combined end gate and scoop board for wagon bodies.

Another object of the invention is the provision of means for securely attaching the end gate to the body in a manner to prevent loss of fine grain or any like material, when the end gate is closed and to provide means whereby the contents of the body may be conveniently removed.

With the above and other objects in view, the invention further includes the following novel features and details of construction, to be hereinafter more fully described, illustrated in the accompanying drawings and pointed out in the appended claims.

In the drawings:—

Figure 1 is a rear elevation of a wagon body with the invention applied thereto.

Figure 2 is a section on the line 2—2 of Figure 1, showing the end gate in closed position.

Figure 3 is a similar view showing the end gate open.

Figure 4 is a horizontal section on the line 4—4 of Figure 1.

Figure 5 is a detail perspective view of the attaching frame.

Figure 6 is an enlarged fragmentary sectional view on the line 6—6 of Figure 1.

Figure 7 is a fragmentary side elevation of the rear portion of the wagon body.

Referring in detail to the drawings, wherein like characters of reference denote corresponding parts, the reference character 10 indicates a portion of the body of a wagon, to which the invention is shown as applied.

The invention includes an attaching frame 11 which is formed of side members 12 and a bottom connecting member 13, each of said members being cross sectionally channel-shaped and designed to be received within a transverse groove G, which usually receives the ordinary end gate. The side members 12 are each provided with an inwardly extending wear plate 14, whose shape is substantially triangular and which extends within the body of the wagon and lies against the inner side face of said body. The inner inclined edge of each of the plates 14 is provided with a flange 15 which is spaced from the face so as to form a groove 16, which extends from the top to the bottom of the plate 14.

Located within the bottom of the body 10 at the rear end thereof is a sill 17, which is substantially wedge-shaped in cross section. The sill 17 is grooved upon its under side as shown at 18 so as to receive the bottom member 13 of the attaching frame 11. This sill 17 extends entirely across the bottom of the body 10 and has positioned thereon a cover or wear plate 19, the said plate 19, the sill 17 and the bottom of the member 13 of the frame 11 being connected by means of bolts 20. The side members 12 of the frame 11 are also suitably bolted or riveted to the sides of the body 10.

Hingedly secured to the plate 19 as shown at 21 is an end gate or scoop board 22, each side edge of the latter being provided with substantially triangular wings 23, which, when the end gate or scoop board 22 is closed will have their free longitudinal edges engaged within the grooves 16 of the attaching frame 11. A tight joint between the end gate or scoop board 22 and the wagon body is thus provided, which will effectually prevent loss of grain or any like material carried within the body.

Extending transversely of the end gate 22 is a bar 24, whose opposite ends are provided with right angular extensions 25 and with hooks 26. These hooks are adapted for detachable connection with a chain 27, one of which is secured upon opposite sides of the body by means of an eye 28. The degree of opening of the end gate 22 may thus be regulated.

Pivotally secured to the end gate 22 as shown at 29 is a lever 30 and pivotally secured to this lever upon opposite sides of the pivot 29 as shown at 31 are the inner ends of bolts or rods 32, the latter operating through guides 33 secured to the end gate. The bolts or rods 32 are adapted to be projected beyond the side edges of the end gate for engagement with eyes or keepers 34, which are formed in plates, which also form the eyes 28 and when so engaged will securely hold the end gate in closed position. Accidental disengagement of the rods or bolts 32 from the eyes or keepers 34 is prevented by means of an inclined cam member 35 which is mounted upon the end gate 22. One end of this member 35 provides a shoulder 36, against which one end of the lever 30 is adapted to engage to prevent accidental movement of the said lever in one direction.

The rod which forms a part of the hinged connection 21 of the end gate is extended beyond said hinge as at 37 and terminates in an upwardly extending arm 38 whose extremity is received within a spring catch 39, carried by the end gate, so that the latter may be easily and quickly removed from the wagon by disconnecting the hinge 21. The end gate is further provided with a handle or grip 40, which provides convenient means for use in removing or positioning the end gate.

The invention is susceptible of various changes in its form, proportions and minor details of construction and the right is herein reserved to make such changes as properly fall within the scope of the appended claims.

Having described the invention what is claimed is:—

1. The combination with a wagon body, of a frame secured to the rear end thereof, grooved plates carried by the frame and located upon each side of and within the body, an end gate hingedly secured to the body, leaves extending inwardly from each side of the gate for engagement in the grooves of the plates and means for holding the end gate in closed position.

2. The combination with a wagon body, of a frame secured to the rear end thereof, grooved plates carried by the frame and located upon each side of and within the body, an upwardly and outwardly inclined sill located within the end of the body, a cover plate secured to the sill, an end gate hingedly secured to the cover plate, leaves extending inwardly from each side of the end gate for engagement in the grooves of the frame carried plates and means for holding the end gate in closed position.

3. The combination with a wagon body, of a frame formed of channeled side members and a channeled bottom connecting member secured within the body, grooved plates carried by the frame and located upon each side of and within the body, an end gate hingedly secured to the body, leaves extending inwardly from each side of the gate for engagement in the grooves of the plates and means for holding the end gate in closed position.

4. The combination with a wagon body, of a frame secured to the rear end thereof, relatively wide side plates carried by the frame and positioned within the body at each side of the latter, spaced flanges extending along the inner edges of said plates and defining grooves, an end gate hingedly secured to the body, leaves extending inwardly from each side of the gate for engagement in the grooves of the plates and means for holding the end gate in closed position.

In testimony whereof I affix my signature.

ELLIS R. ULLOM.